(No Model.) 2 Sheets—Sheet 1.

A. GAUTIER.
EXPANSIBLE PIN CONNECTION.

No. 364,584. Patented June 7, 1887.

WITNESSES:
C. J. H. Arnou.
Paschal J. Ferard.

INVENTOR:
Alexandre Gautier,
By his Attorneys,
Arthur C. Fraser &co.

(No Model.) 2 Sheets—Sheet 2.

A. GAUTIER.
EXPANSIBLE PIN CONNECTION.

No. 364,584. Patented June 7, 1887.

WITNESSES:
C. J. H. Amon
Paschal J. Ferrara

INVENTOR:
Alexandre Gautier,
By his Attorneys,
Arthur C. Fraser & Co

United States Patent Office.

ALEXANDRE GAUTIER, OF PARIS, FRANCE, ASSIGNOR TO THE SOCIÉTÉ GAUTIER, POZZY & CIE.

EXPANSIBLE PIN-CONNECTION.

SPECIFICATION forming part of Letters Patent No. 364,584, dated June 7, 1887.

Application filed March 19, 1887. Serial No. 231,516. (No model.) Patented in France January 6, 1885, No. 166,278; in Germany October 5, 1885, No. 35,290; in England December 28, 1885, No. 15,938; in Spain March 23, 1886, No. 5,478, and in Belgium December 28, 1886, No. 71,389.

*To all whom it may concern:*

Be it known that I, ALEXANDRE GAUTIER, a citizen of the French Republic, residing in Paris, France, have invented certain new and useful Improvements in Mechanical Joints or Pin-Connections, of which the following is a specification.

This invention relates to various kinds of mechanical joints—such as pivots, knuckle-joints, hinges, couplings, &c.—wherever a pin or bolt is used to connect two mechanical parts, whether the connection be mobile or rigid.

My improved joint or connection is characterized by the employment of a novel kind of pin or bolt. This pin consists of a band of steel or other resilient metal coiled into a convolute spiral, after the manner of a clock-spring, and inserted in a compressed condition into the bore or socket of the mechanical parts that are to be united. The pin thus constructed tends to expand within the bore and fills the latter completely, so that there is no looseness or lost motion.

This invention is the subject of a patent in France, No. 166,278, dated January 6, 1885; in Germany, No. 35,290, dated October 5, 1885; in Spain, No. 5,478, dated March 23, 1886; in Belgium, No. 71,389, dated December 28, 1886, and in Great Britain, No. 15,938, dated December 28, 1885.

The band of steel should have a width equal to the length of the bore or socket which is to receive it, and may be of greater or less thickness, and may be coiled with more or fewer convolutions, depending upon the diameter of the bore and the amount of strain to which it is to be subjected in use.

This improved joint thus overcomes the disadvantages inherent in the joints as ordinarily heretofore constructed, of looseness or lost motion due to inaccurate fitting or to wear in use, since it adjusts itself perfectly to the bore and takes up automatically any looseness or play that may occur.

The accompanying drawings illustrate several different applications of my invention.

Figure 1:
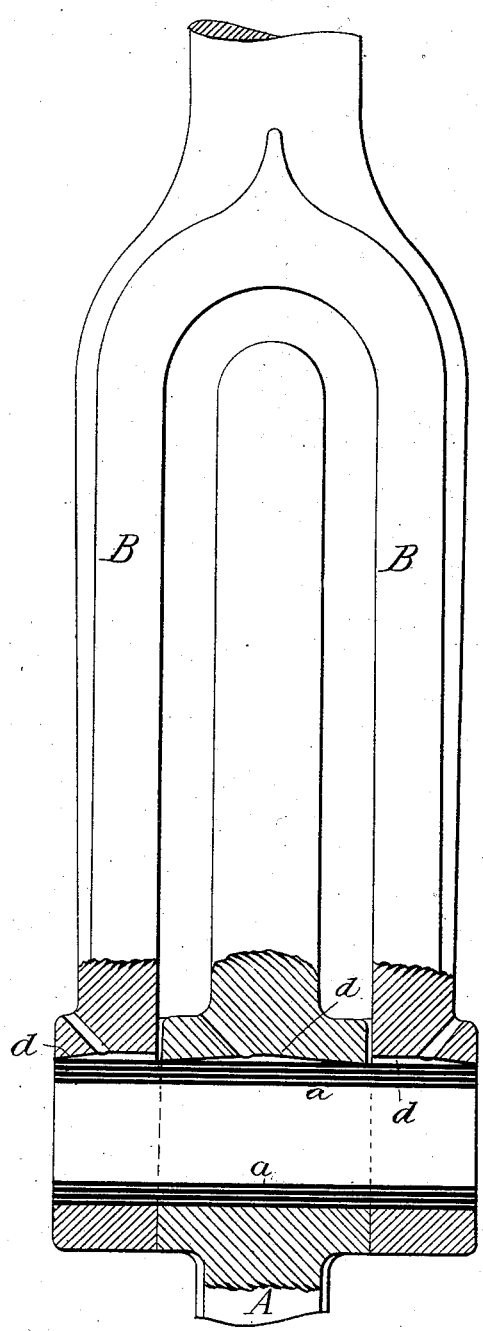
Figure 2:
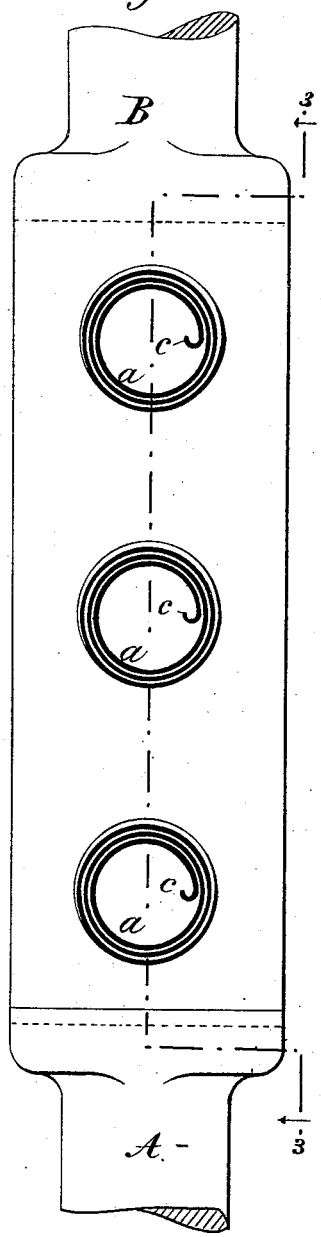
Figure 3:
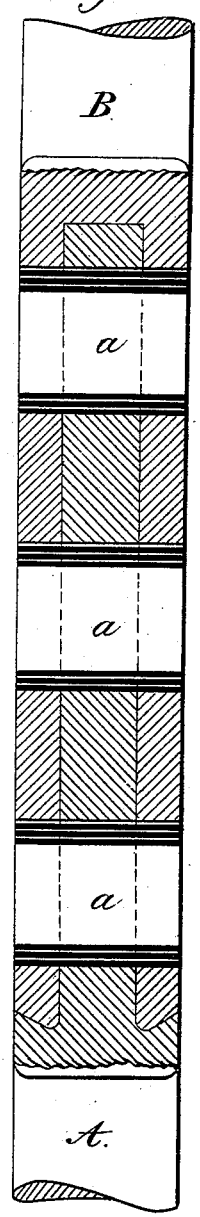
Figure 4:
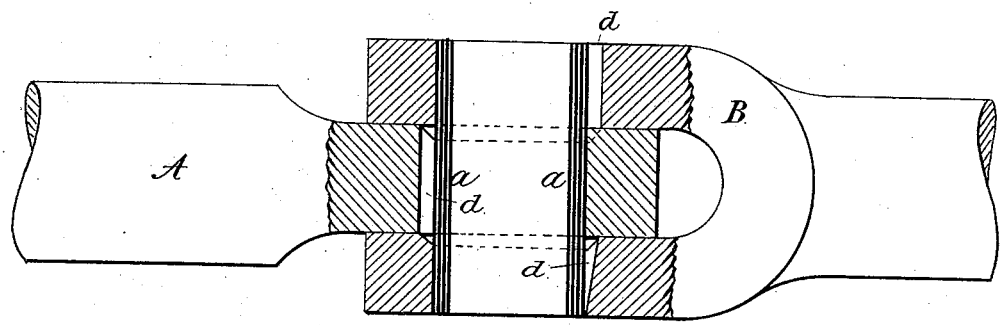
Figure 5:
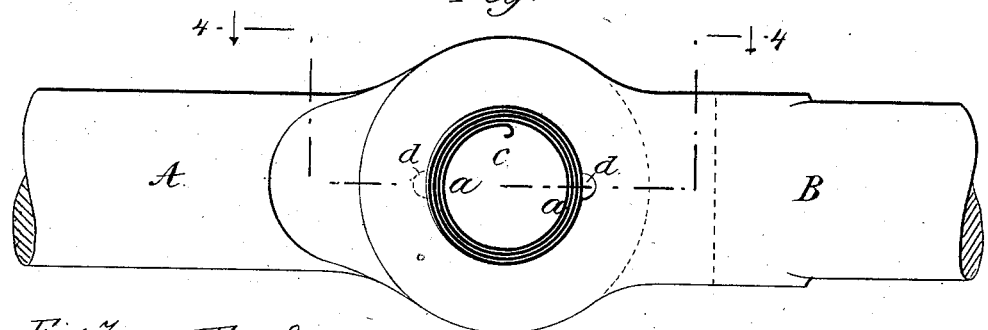
Figures 7, 8:
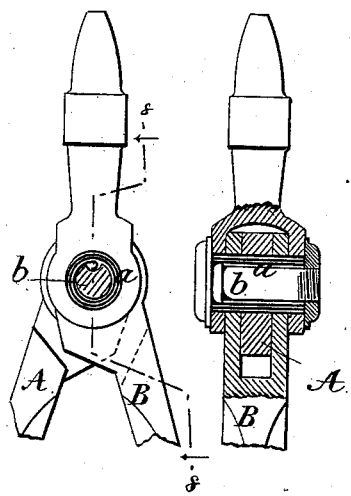
Figure 6:
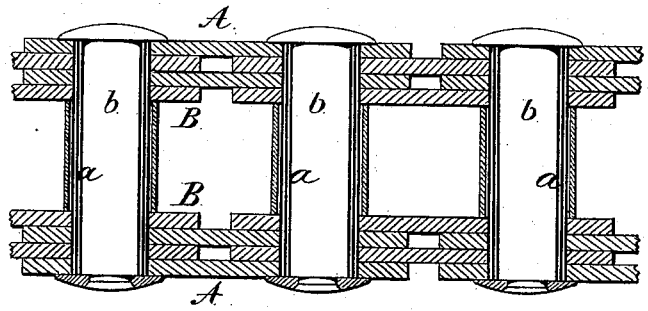

Figure 1 shows its application to the pivotal joint of a pitman or connecting-rod (lettered B) to a sliding rod (lettered A) which it actuates. Figs. 2 and 3 illustrate its application to a coupling or rigid joint in a pump-rod, boring-bar, or other mechanical part, the former view being a side elevation, and the latter a longitudinal section cut in the plane of the line 3 3. Figs. 4 and 5 illustrate the application of my invention to the joint of railway switch or signal operating rods used for transmitting motion from a switch or signal house to a distant switch, semaphore, or other device along the line. Fig. 5 is a plan view, and Fig. 4 is a side elevation, partly in vertical section, cut along the line 4 4. Fig. 6 illustrates its application to a fusee-chain or drive-chain, the view being a section longitudinally of the links and in the plane of the pivotal axes. Figs. 7 and 8 show the application of my invention to the joint of a compass or divider, the former view being a side elevation, partly in section, and the latter an edge view, partly in section, on the line 8 8.

In the several figures of the drawings, the letters A and B designate the respective parts that are united together by the joint, and the letter *a* designates my improved expanding pin.

The parts A B have a hole or socket bored through them in the ordinary manner. The pin *a* is made from a band of steel of the proper spring temper, the width of which should equal the length of the bore through the two parts A B. One end of the band is bent into a hook, *c*, and the band is coiled into a convolute spiral in the same manner as a clock-spring. When thus coiled it is of a diameter considerably larger than that of the bore which is to receive it. In order to insert it in the bore, it is compressed tightly by winding it, and is forced into the bore in the same manner that a clock-spring is inserted into its barrel. The hook *c* is for the purpose of enabling the convoluted band to be thus coiled. The convoluted band, upon being thus inserted in the bore, expands forcibly therein, so that it bears on all sides against the wall of the bore, adapting itself thereto by reason of its elasticity and expansive resilience. The number of convolutions of the band will depend upon the shearing strain exerted on the total section and on the thickness of the band. It will thus be extremely variable. The thickness of the band should vary according to the diameter of the bore, a thicker band being used for a large bore than for a small one. Furthermore, it is preferable to make the band taper from one end toward the other, in order that the internal convolutions shall be thinner than the external ones. In addition, whatever may be the thickness of the band, the end which comes in contact with the bore should be tapered down gradually to a thin edge in order to insure a good contact with the wall of the bore. The opposite or inner end of the band should always be formed with the hook $c$, for enabling the convoluted coil to be rolled up in order to insert or remove it.

In most cases the expanding coiled pin $a$ will alone serve for effectually uniting the parts, and no bolt is necessary; but in some instances it may be advisable to employ a bolt in addition, as shown in Figs. 6, 7, and 8, where the bolt is lettered $b$. A bolt or rivet is only necessary in those cases where the parts joined together are liable to move apart in the direction of the axis of the bore—as, for example, if the two arms of the forked rod B in Fig. 1 were of considerable length, so that they might spring apart. In the case of the chain shown in Fig. 6, bolts, rivets, or equivalent fastenings are necessary in order to prevent the separation of the links in lateral direction.

As applied to dividers or compasses, as shown in Figs. 7 and 8, my expanding pin has the advantage of imparting a certain degree of frictional resistance to the parts, so that the legs of the dividers, when opened to any extent, will remain in that position.

My improved joint is equally applicable to pivotal or oscillatory connections and to rigid connections. Figs. 1, 4, and 5 are examples of the former, and Figs. 2 and 3 of the latter. In the former figures I have shown grooves $d\ d$ for the passage of oil to lubricate the joints. As applied to a rigid connection or coupling, such as that shown in Figs. 2 and 3, my improved expanding pin has the effect of a linchpin or key, and has the advantages of fitting itself tightly to the hole and of drawing the parts firmly together, so that there is no looseness in the connection.

The applications of which my improved expanding pin or bolt is capable may be multiplied in great number, as will be readily apparent to mechanics who have to construct or use any of the numerous joints, pivots, hinges, couplings, or other connections to which it is applicable; but I believe that the examples illustrated in the accompanying drawings will suffice to make clear its construction and the scope of its applicability.

It will be understood that the band or ribbon employed for making the expanding pin may be of other metals than steel. It is only essential that the material used shall have sufficient elasticity and strength for the purpose.

Having thus described my invention, what I claim, and desire to secure by Letters Patent, is the following defined novel features or combinations, substantially as hereinbefore specified, namely:

1. An expanding pin for mechanical joints or connections, consisting of a band of resilient material coiled into a convolute spiral, the convolutions of which are superposed after the manner of a clock-spring.

2. An expanding pin for mechanical joints or connections, consisting of a band of resilient material coiled into a convolute spiral, and formed with a hook, $c$, at its inner end.

3. An expanding pin for mechanical joints or connections, consisting of a band of resilient material coiled into a convolute spiral, and having the inner convolutions of less thickness than the outer ones.

4. An expanding pin for mechanical joints or connections, consisting of a band of resilient material coiled into a convolute spiral, and having its outer end tapered gradually to a thin edge.

5. A mechanical joint consisting of the combination, with the two parts to be united, having an axial bore through them, of an expanding pin consisting of a coiled band of resilient material compressed and inserted in said bore.

6. A mechanical joint consisting of the combination, with the two parts to be united, having an axial bore through them, of an expanding pin consisting of a coiled band of resilient material compressed and inserted in said bore, and a bolt passing through the center of said pin, with its heads embracing the parts to be united, in order to prevent axial displacement thereof.

In witness whereof I have hereunto signed my name in the presence of two subscribing witnesses.

ALEXANDRE GAUTIER.

Witnesses:
JEAN BORDENAVE,
AMAND RITTER.